United States Patent [19]

Guerrero

[11] 3,878,104

[45] Apr. 15, 1975

[54] POROUS EARTHENWARE SUPPORTING MEMBERS FOR REVERSE OSMOSIS MEMBRANES, PROCESS OF MANUFACTURE AND APPARATUS USING SAME

[75] Inventor: Jesus Martinez Guerrero, Mexico City, Mexico

[73] Assignee: Comision Para El Aprovechamiento De Aquas Salinas, Tecamachalco, D.F., Mexico

[22] Filed: Sept. 25, 1973

[21] Appl. No.: 400,744

[30] Foreign Application Priority Data

Aug. 20, 1973  Mexico ............................... 145657

[52] U.S. Cl. .................... 210/323; 106/41; 117/98; 210/321; 210/433; 210/490; 210/510; 260/2.5 M
[51] Int. Cl. ............................................ B01d 31/00
[58] Field of Search ........... 210/321, 456, 489, 490, 210/496, 500, 510, 323, 433; 260/2.5 M; 264/41, 49; 106/41, 65, 67; 117/98

[56] References Cited
UNITED STATES PATENTS

| | | | |
|---|---|---|---|
| 3,390,779 | 7/1968 | Kumme et al. | 210/456 X |
| 3,392,840 | 7/1968 | Clark et al. | 210/496 X |
| 3,430,770 | 3/1969 | Clark et al. | 210/489 X |
| 3,462,362 | 8/1969 | Kollsman | 210/321 X |
| 3,480,147 | 11/1969 | Kanyok | 210/321 |
| 3,544,358 | 7/1966 | Manjikian | 210/490 X |
| 3,610,418 | 10/1971 | Calderwood | 210/490 X |

Primary Examiner—Frank A. Spear, Jr.
Attorney, Agent, or Firm—Sughrue, Rothwell, Mion, Zinn & Macpeak

[57] ABSTRACT

A porous earthenware supporting member for reverse osmosis membranes comprises an elongated cylindrical hollow member of a calcined clayey porous material preferably of the montmorillonite type, said elongated cylindrical hollow member being provided with intercommunicated pores of a diameter of not more than 1 micron, said elongated cylindrical hollow member showing highly smooth surfaces in order to provide a uniform support for a reverse osmosis membrane operated at very high pressures.

A process for the manufacture of a porous earthenware supporting member for reverse osmosis membranes comprises admixing a fine grained clay, preferably of the montmorillonite type, with a finely divided particulate volatile material with particles having a diameter of not more than 1 micron, and water, in order to produce a clayey thick mud, kneading the thus produced clayey thick mud, granulating the kneading mixture, applying a vacuum thereto in order to remove the trapped air, extruding the same under high pressure to form an elongated cylindrical member, drying the thus extruded elongated cylindrical member and calcining the same at high temperature in order to volatilize the volatile material to produce intercommunicated minute pores throughout the body of said elongated cylindrical member.

9 Claims, 4 Drawing Figures

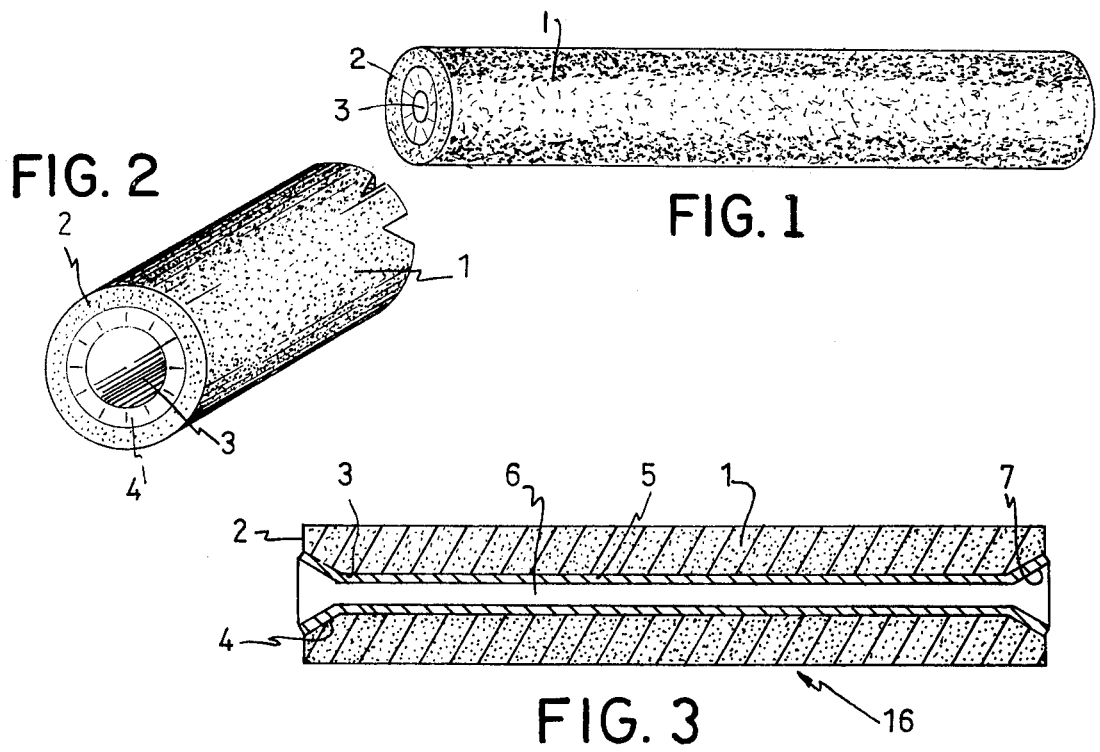
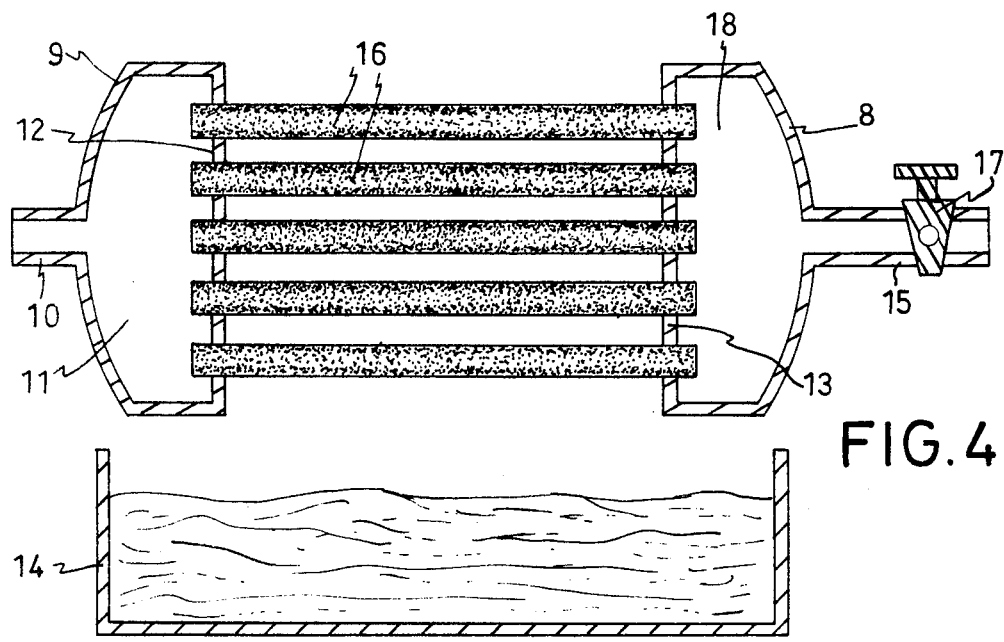

POROUS EARTHENWARE SUPPORTING MEMBERS FOR REVERSE OSMOSIS MEMBRANES, PROCESS OF MANUFACTURE AND APPARATUS USING SAME

BACKGROUND OF THE INVENTION

The present invention refers to a novel supporting member for reverse osmosis membranes and to a process of manufacture thereof, and it more particularly refers to an earthenware supporting porous member having a highly smooth surface to provide for a uniform and even support for reverse osmosis membranes, as well as to an apparatus for removing salt from salt-containing water using said supporting members and reverse osmosis membranes.

Heretofore, osmotic processes which have been proposed for use in the removal fo salts from salt-containing waters, such as for removing salt from sea water, have been carried out in apparatus generally comprising a plurality of candle shaped elongated supporting members, which have been generally built of very costly porous materials such as porcelain, sinterized metals and the like, on which outer surface a bag of a suitable reverse osmosis material or membrane is engaged by means of an adhesive, said candle shaped members being engaged to a header and an outer shell being provided to form a pressure chamber for pressure filtering the sea water or the like through the reverse osmosis membrane duly supported by the candle like members of porous material, whereby the fresh water is received within said hollow candle like members of porous material and hence through the header, out of the filtration apparatus. The membranes used in connection with this osmotic processes, which are still in an experimental stage, due to the high cost of maintenance and acquisition of equipment, (which raises the cost of production of fresh water) are generally comprised of a thick film of a plastic material such as cellulose acetate or the like, suitably treated to act as a molecular sieve permitting passage of water molecules but preventing passage of salt molecules.

Heretofore, osmotic filtration apparatus of the above mentioned type have been used for removing the salt from salt containing waters, but the cost of operation of said apparatus is very high and the prior art apparatus shown very serious drawbacks, such as the very high cost of the necessary equipment, the brittleness of the candle like members of porous materials such as porcelain, sinterized metal and the like, and the high cost of the shells surrounding the filters, because it has been necessary to direct the filtration from the outside of the candle like members towards the inside thereof, in order to enable the same, being made of a very brittle material, to withstand the extremely high pressures used for forcing the water through the very tiny molecular pores of the reverse osmosis membranes supported thereby.

In other words, all of the prior art equipment for osmotic filtration is generally comprised of a series of candle like members, closed at one end and open at the opposite end and on the outer surface of which a homogeneous and uniform reverse osmosis bag-like membrane is suitably bonded by means of an adhesive, in order to exert pressure toward the inside of the candles, so as to take advantage of the compression resistance of the porous material, as said materials generally do not withstand high tensile stresses as those which may be caused by high pressures exerted from the inner bores thereof towards the outside.

It will be clearly seen by any one skilled in the art that this type of equipment must be of necessity very costly, in view of the fact that the pressure chamber is generally very large and requires very thick and strong materials for the outer shell as well as for the header where the candle like members are attached.

Regardless of the above, the candle like members frequently implode due to the very high pressures used in osmotic filtration processes, which renders the maintenance costs of this type of equipment very high, whereby osmotic processes of this type have not grained the favor of industry and have thus remained in an almost experimental stage.

It will thus be seen that the main problem with osmotic filtration equipment resides on the supporting members for the reverse osmosis membranes, and that a sufficiently resistant supporting device which may withstand very high tensile stresses to enable to reverse the flow of liquid in the equipment, has been for long highly desired but has not been devised in the past.

The convenience of reversing the flow of liquid in osmotic filtration equipment is obvious, inasmuch as this would enable the provision of a very small and strong pressure chamber inside the headers supporting the membrane-supporting member assemblies, at a low cost, while the shell of the filter may be a simple sleeve or bag of plastic material or may even be dispensed with, thus considerably reducing the cost of the apparatus and at the same time minimizing the maintenance and operation costs, as well as increasing the efficiency thereof.

BRIEF SUMMARY OF THE INVENTION

Having in mind the defects of the prior art osmotic filtration equipment, the present invention provides an elongated cylindrical hollow supporting member for reverse osmosis membranes, which is highly resistant to tensile stresses whereby the membranes can be attached to the interior wall of the hollow supporting members, while providing a very efficient pore structure, thus reducing the size of the pressure chamber necessary to force the liquid therethrough.

The present invention also provides a supporting member for reverse osmosis membranes, of the above mentioned character, which is very low priced and easy to manufacture, and nevertheless possesses a high volume pore structure and a very high smoothness to provide for the uniform support of the reverse osmosis membranes.

The present invention additionally provides an earthenware hollow supporting member for reverse osmosis membranes, of the above mentioned character, which has a very uniform and fine porosity permitting the unobstructed membrane supported on the inner bore thereof.

The present invention further provides a method for the manufacture of a supporting member for reverse osmosis membranes, which is very simple to carry out and produces a controlled very fine porosity throughout the body of the supporting member.

The present invention more particularly provides a process for the manufacture of supporting members for reverse osmosis membranes, of the above mentioned character, which produces a very uniform quality material having a high tensile strenght as is necessary for osmotic filtration equipment where the flow of the liquid is from the inside toward the outside of the supporting members.

The present invention further provides a filtration apparatus using reverse osmosis membranes attached to the interior surfaces of supporting members of the above mentioned character, whereby the pressure chamber is considerably reduced in size and the strenght of the materials used in the apparatus is considerably reduced.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of certain specific embodiments when read in connection with the accompanying drawings, in which:

FIG. 1 is a perspective view of a supporting tube for reverse osmosis membranes, manufactured in accordance with the present invention;

FIG. 2 is a perspective fragmentary view of a supporting tube similar to that shown in FIG. 1, showing the shape of one of the flat open ends thereof;

FIG. 3 is a cross-sectional view of a supporting tube for reverse osmosis membranes, showing the manner in which the membrane is arranged on the interior surface thereof; and FIG. 4 is a diagrammatic cross-sectional elevational view of an osmotic filtration apparatus built in accordance with a preferred embodiment of the present invention.

DETAILED DESCRIPTION

Having now more particular reference to the drawings, and more specifically to FIGS. 1 to 3 thereof, a clayey supporting pipe for reverse osmosis membranes is shown, which comprises a cylindrical member 1, having an inner longitudinal cylindrical bore 3 and open flat ends 2. Each of the open flat ends 2 of the tube 1 is provided, as a continuation of the inner surface of the bore 3, with a taper 4 as more clearly shown in FIGS. 2 and 3 of the drawings, for the purpose of providing for the suitable support of a reverse osmosis membrane 5. As more clearly shown in FIG. 3 of the drawings, the reverse osmosis membrane 5 is arranged in the form of a thin tube which is inserted within bore 3 of the supporting tube 1, and expanded thereinto, with the previous application of a suitable adhesive such as an epoxy resin or the like. The ends of the reverse osmosis membrane 5 are flared out as shown at 7 in FIG. 3 of the drawings, in order to conform said ends to the tapers 4 of the inner bore 3 of tube 1. Thus the position of the reverse osmosis membrane 5 is secured within the bore 3 of the supporting tube 1, whereby a thin longitudinal bore 6 is provided to force the liquid to be filtrated from the inside of said longitudinal bore 6 through membrane 5 and hence through the porous body of the tube 1, towards the outside.

The supporting tube built in accordance with the present invention is an earthenware tube made up of a specially treated porous clayey material, such as a suitable pottery and sculpture mud of the montmorillonite type, provided that said material is highly plastic when moist, and of a quality adapted to sculpturing. The mud, to be suitable, must be previously purified by removing all sand and stones present therein by suspending it in water, filtering the same through a suitable sieve, and then drying it in order to produce a very fine powdered material which may be suitable for forming by the extrusion process. The material is preferably montmorillonite type of clay having a formula of the type $[Al_2Si_4O_{10}(OH)_2]$.

The supporting tubes built in accordance with the present invention can be used to produce an osmotic filtration apparatus such as that shown in FIG. 4 of the drawings. A preferred apparatus built in accordance with the present invention comprises a plurality of supporting tube and reverse osmosis membrane assemblies 16, arranged in the manner of a tube bundle as very clearly shown in FIG. 4 of the drawings, one end of which is attached to the bores of plate 13 of a discharge header 8 and the opposite end of which is attached to the bores of a perforate plate 12 provided at the other end of the apparatus. The plate 12 forms an integral part of a dished header 9 having an inlet opening 10, whereby a small pressure chamber 11 is formed to force the liquid to be filtrated towards the interior of the bores 6, through the reverse osmosis membranes 5, and out of the body of the supporting tubes 1, to a compartment formed, for instance, by a tray 14 which completes the structure of the filtration apparatus. The pressure of the liquid is controlled by valve 17 provided in the outlet 15 of header 8, whereby the salt-containing water flows from chamber 11 into the assemblies 16 in which it is osmotically concentrated, hence to chamber 18 of header 8 and through the valve 17 of outlet 15 out of the apparatus. Pure fresh water percolates through the reverse osmosis assemblies 16 and hence to the collecting receptacle 14 or the like.

It will be seen from the above that the apparatus built in accordance with the present invention and using the novel supporting members 1, is of a very low cost because there is no need of providing a shell of any type, as it can be replaced by a tray or a plastic sleeve, inasmuch as this part of the osmotic filtration apparatus is not subjected to a high pressure and, instead, the only portion of the apparatus subjected to said high pressure is a small pressure chamber 11, the inner bores 6 of the reverse osmosis assemblies 16 and a further small pressure chamber 18, as very clearly shown in FIGS. 3 and 4 of the drawings. This enables to carry out the osmotic process at a very low cost and it will of course enable osmotic filtration of any type of salt-containing waters which at present cannot use osmotic processes to be filtrated, in view of the very high acquisition and maintenance costs of the prior art equipment. The very high tensile strenght of the supporting tubes built in accordance with the present invention, enable the reversal of the flow customarily used for this type of osmotic filtration equipment, said flow being thus effected from the inside towards the outside of the supporting members.

The supporting tubes of the present invention, to be used in combination with reverse osmosis membranes, require highly critical characteristics which must be provided by the process for the manufacture thereof. In broad terms, said supporting tubes must have a high tensile strenght to withstand high internal pressures, must be of a highly porous structure in order to avoid pressure drops through the walls of the tubes and at the same time must contain pores not larger than 1 micron in its largest dimension so as to provide a very smooth surface which will evenly support a highly rupturable reverse osmosis membrane which is customarily used in association therewith and, finally, must contain a thoroughly intercommunicated pore structure throughout the body of the tube, so as to provide uninterrupted channels from the inner to the outer wall thereof.

In order to achieve the above goals, the present invention provides a highly preferred process for the manufacture of supporting tubes for reverse osmosis membranes, which comprises the steps of:

a. comminuting a clayey material of the montmorillonite family having the formula $[Al_2Si_4O_{10}(OH)_2]$, down to a particle size of 1 nanometer or less (minus $10^{-9}$m.), with said clayey material containing moisture not higher than 1.5% prior to its entrance to the mill, whereby a highly uniform and plastic mud may be produced with these submicroscopic particles of clayey material;

b. admixing the montmorillonite type finely divided clayey material with suitable proportions of a finely divided volatile material having a particle size of not more than 1 micron in its largest dimension, said volatile material being such that it will completely volatilize at a temperature higher than 1000°C. without leaving a single trace thereof.

c. adding a suitable proportion of water to form a thick mud or paste;

d. kneading the paste vigorously during a period of from about 3 to 5 minutes, in order to homogenize the same;

e. continuing the kneading process while adding additional amounts of water to maintain certain fluidity in the paste;

f. powdering the thus formed paste to a small particle size and applying a vacuum of from 3 to 10 Torr in order to expel any trace of air which might be contained within the body of the paste, so as to produce a perfectly homogeneous paste capable of forming an extruded body without any blisters or the like and of providing a highly smooth surface in said extruded body;

g. extruding the thus deaerated moist paste through an extruder operating under a pressure of from about 20 to 30, preferably 25 tons for square centimeter, in order to form an extruded tube containing from about 25 to 26% moisture at ambient temperature;

h. predrying the thus extruded tube with warm air at a temperature of from about 30° to 40°C., preferably 35°C., during a period of time of from 4 to 8 hours, preferably 6 hours, in order to reduce the moisture content to between about 8 and 12%, preferably 10%;

i. drying the predried tube at a temperature of from about 70° to 180°C., preferably 150°C., for a period of time of from 4 to 10 hours, preferably 6 hours, in order to reduce the moisture content to between 1 and 3%, preferably 2%, in order to avoid caramelization of the volatile material incorporated, should the latter be of the organic polysaccharide or glucide type;

j. after obtaining a moisture content comprised between 1 and 3%, increasing the drying temperature up to a temperature of from about 300° to 400°C., preferably 350°C., for one additional hour in order to reduce the moisture content to less than 0.5%;

k. finally, calcining the dried tube at a temperature of from about 1000° to 1050°C., preferably 1020°C. for a period of time of from 4 to 8 hours, preferably 6 hours in order to reduce the moisture content to 0.0% and at the same time in order to completely volatilize the volatile material previously incorporated, whereby a very fine and dense intercommunicated pore structure is left throughout the body of the tube.

As suitable volatile materials which can be used for admixing with the clayey material in accordance with the present invention, in order to provide the necessary porous structure in the supporting member, any type of organic material capable of being volatilized at temperatures over 1000°C. without leaving any trace can be mentioned. Particularly preferred volatile materials are low priced organic materials, preferably polysaccharides and saccharides or glucides such as wheat flour, corn flour, starch, glucose, saccharose and the like, with the proviso that said volatile material be previously comminuted to obtain a particle size of not more than 1 micron in its largest dimension, whereby the minute particles of the volatile material, when the supporting tube is calcined in accordance with step (k) above, are transformed into carbon dioxide and water, thus leaving the voids originally occupied by the particles, to produce the desired porosity.

The very fine porosity of the material obtained in accordance with the above described process, enables the thus formed supporting tubes to withstand radially outwardly directed high pressures of the order of from between 55 to 100 kgs. per square centimeter, whereby reverse osmosis membranes can be adhered to the inner surfaces of the bores of the tubes, to effect osmotic filtration of liquids at very high pressures without any possibility of cracking or fracturing due to the high tensile stresses generated within the wall of the tube.

While the mixture of the clayey material, the volatile material and water can be made in any suitable proportions, which are within the search of the skilled artisan, it is preferred to provide a starting mixture comprising from about 75 to 90%, preferably about 83% by weight of a montmorillonite type clay material, from about 5 to 15%, preferably about 10% by weight of a volatile material, such as a polysaccharide, preferably wheat flour, and from about 4 to 10%, preferably about 7% by weight of water. This proportions of the different ingredients of the starting mixture provide for the formation of a very thick mud which, upon extrusion, is self-supporting to avoid undesirable deformation of the extruded pipe while predrying the same.

The drying steps described under paragraphs (h) through (g) above, must be effected stepwise, in view of the fact that, if the volatile material chosen is a polysaccharide such as wheat flour or corn flour, then the polysaccharide tends to caramelize in the presence of relatively large amounts of water, if the temperature is raised above about 70°C. Therefore, a predrying step is necessary in order to reduce the moisture content down to a value which will avoid caramelization of the polysaccharide under the extant conditions. A second drying step at a relatively low temperature is also necessary, this second step being effected at a temperature not higher than 180°C., in order to again avoid caramelization of the polysaccharide at this temperature and in the presence of intermediate amounts of water. Finally, the final drying step can be effected at a high temperature of up to about 400°C., because the very low residual moisture in the mixture does not favor further caramelization of the polysaccharide.

At a moisture content of under 0.5% the temperature of the mixture can be considerably raised without the danger of caramelization, in view of the fact that the polysaccharide is not capable of forming caramel in the presence of these very low amounts of moisture.

The stepwise drying process is also necessary for other volatile materials different from polysaccharides or glucides, because it is necessary to avoid any possible bursting of the minute particles of the volatile material and of water droplets if a very high temperature is suddenly applied to the mass, thus producing a flashing action overcoming the rate of flow of vapors and gases from the inside of the body of the tube, whereby a complete fracture of the body of clayey material can occur.

The invention will best be understood by having reference to the following examples, which must be construed as merely illustrative and not restrictive of the invention.

EXAMPLE 1

4.8 Kgs. of powdered montmorillonite type clayey material obtained from Barriales de Donaji, Oaxaca, Mexico, having an average moisture of 1.5% by weight, and a particle size of under 1 nanometer, were mixed with 0.6 Kgs. of wheat flour having an average moisture of 0.75% by weight and a particle size of not more than 1 micron, and the mixture was kneaded for a period of time of about 4 minutes, with the addition of about 0.4 Kgs. of water portionwise so as to form a thick mud or paste while kneading.

The thus produced paste was powdered and fed to an extruder where a vacuum of 5 Torr was first produced in order to expel all the air and to avoid formation of blisters in the extruded product. The vacuum was applied during a period of time of about 20 minutes and then the paste was extruded under a pressure of 25 tons per square centimeter to form a cylindrical elongated tube.

The thus formed moist tube was placed on a flat surface on which it was rotated while warm air at a temperature of about 35°C. was passed in order to predry the same, with the air being kept under 35°C. so as to avoid cracking of the material, during a period of time of 5 hours in order to produce sufficient rigidity in the tube to render it self-supporting.

Then the tube was dried in a stove at a temperature of about 150°C. during a period of time of 6 hours and thereafter the drying temperature was raised to 350°C. for one additional hour.

The flat ends of the dried tube were cut in order to form a 45° taper on the ends thereof, so as to prepare the same to receive a reverse osmosis membrane.

The tube was then calcined in an oven at a temperature of 1020°C. during a period of time of 4 hours, whereby the wheat flour was completely volatilized, thus leaving a highly uniform and very fine porous structure.

A tube highly suitable for supporting plastic reverse osmosis membranes such as of cellulose acetate was thus provided, having a tensile strenght sufficient to withstand a pressure of over 80 Kg/cm$^2$ radially applied from the inner bore thereof towards its outer surface.

EXAMPLE 2

An osmotic filtration apparatus was built by providing a cylindrical thin reverse osmosis cellulose acetate membrane within the bore of the tube produced in accordance with Example 1, which was expanded and adhered to the surface of the bore of the tube by means of an epoxy resin. The ends of the membrane were flared out in order to conform to the tapers provided at each flat end of the earthenware tube, so as to provide a uniform and complete adherence between the membrane and the tube, thus forming a suitable reverse osmosis assembly.

A plurality of said reverse osmosis assemblies were firmly adhered on one of their ends to the bores of a first perforate header by means of an epoxy resin and the other ends of said plurality of assemblies were bonded to the bores of a second perforate header by means of an epoxy resin, in order to provide a tube bundle which was entirely fluid-tight so as to avoid leaks under the very high pressures used for osmotic filtration of water therethrough.

One of the headers was provided with a pressure control valve and a plastic sleeve was engaged to both headers, whereupon sea water was pumped at a pressure of about 70 Kg/cm$^2$ through one of the perforate headers to force the same through the membrane and supporting tube assemblies, whereupon a good quality fresh water was collected within the shell of the apparatus, from which it was removed through a suitable outlet in the plastic sleeve. The concentrated water was discharged through the pressure control valve provided in the other header.

From the above it will be seen that for the first time a suitable supporting porous member has been provided, which has a structure and a strenght sufficient to provide for the placement of suitable reverse osmosis membranes within the inner bores thereof, whereby the flow of the liquid to be osmotically filtrated can be effected radially towards the outside of the thus formed assemblies, considerably reducing the cost of operation as well as the cost of acquisition of the equipment necessary to effect osmotic processes of this type.

Although certain specific embodiments of the invention have been shown and described above, it is to be understood that many modifications thereof are possible. The invention, therefore, is not to be restricted except insofar as is necessitated by the prior art and by the spirit of the appended claims.

What is claimed is:

1. A porous eathenware supporting member for reverse osmosis membranes comprising an elongated cylindrical earthenware body, a cylindrical longitudinal inner bore along the axis of said body and concentrical with the outer surface thereof, said cylindrical body having flat ends, said concentrical bore being open at both said flat ends and comprising an outwardly flaring taper at each of said ends, said cylindrical body comprising a porous earthenware material which is a calcined clayey highly-plastic-when-wet material of the montmorillonite type and having the condensed formula "$Al_2 Si_4 O_{10}(OH)_2$," said calcined earthenware material having fully interconnected pores throughout said body and of a size not larger than 1 micron in their largest dimension, so as to provide for the free liquid intercommunication between the said bore and the outer surface of said body without appreciable pressure drop therethrough, said cylindrical earthenware body having a tensile strength sufficient to withstand radial outward pressures applied on the wall of said bore of up to about 100 Kg/cm$^2$, whereby a reverse osmosis membrane can be evenly adapted to said inner bore for effecting an outward high pressure flow of a liquid to be osmotically filtrated.

2. A process for manufacturing a porous earthenware supporting member for reverse osmosis membranes which comprises the steps of:
   a. comminuting a clayey material of the montmorillonite type and having the formula "$Al_2Si_4O_{10}(OH)_2$" to a very fine particle size of less than 1 nanometer;
   b. admixing the finely divided clayey material with a finely divided volatile material which will completely volatilize at a temperature of over 1,000°C. and having a particle size of under 1 micron;
   c. adding a suitable amount of water to said mixture so as to obtain a thick mud or paste;
   d. vigorously kneading the thus formed paste to thoroughly homogenize the same;
   e. continuing the kneading operation while adding more water to maintain a proper fluidity in the paste;
   f. powdering the paste to a small particle size a applying a vacuum thereto in order to expel any trace of air contained therewithin;
   g. extruding the deaerated paste to from a green elongated cylindrical member or tube having a cylindrical inner bore open at both ends thereof;
   h. drying the extruded green tube to a moisture content of not more than about 0.5% by weight; and
   i. calcining the dried tube at a high temperature sufficient to cure the earthenware material and to completely volatilize said volatile material previously added in order to leave a very fine and dense intercommunicated pore structure throughout the body of the tube.

3. A process as claimed in claim 2 wherein said finely divided volatile material is a polysaccharide having a particle size of under 1 micron in its largest particle dimension.

4. A process as claimed in claim 3 wherein said polisaccharide is wheat flour.

5. A process as claim in claim 3 wherein said drying step is carried out stepwise and comprises the steps of:
   a. predrying the extruded tube with warm air at a temperature of from 30° to 40°C., preferably 35°C. during a period of time of from 4 to 8 hours, preferably 6 hours in order to reduce the moisture content to between 8 and 12%, preferably about 10% by weight;
   b. drying the predried tube at a temperature of from about 70° to 180°C., preferably 150°C. for a period of time of from about 4 to 10 hours, preferably 6 hours, to reduce the moisture content to between about 1 and 3%, preferably about 2% by weight; and
   c. thereafter increasing the drying temperature up to about 300° to 400°C., preferably about 350°C. for one additional hour in order to reduce the moisture content to less than about 0.5% by weight.

6. A process as claimed in claim 2 wherein the dried tube is calcined at a temperature of from about 1,000° to 1,050°C., preferably about 1,020°C. for a period of time of from about 4 to 8 hours, preferably about 6 hours in order to reduce the moisture content to 0.0% and to completely volatilize said volatile material.

7. A process as claimed in claim 2 wherein said volatile material is present in the extruded green tube in a proportion of from 5% to 15%, preferably about 10%, by weight.

8. A reverse osmotic filtration apparatus comprising a plurality of reverse osmosis assemblies each comprising a porous supporting tube made of an earthenware material which is a calcined clayey highly-plastic-when-wet material of the montmorillonite type and having the condensed formula "$Al_2Si_4O_{10}(OH)_2$", said supporting tube having flat ends and a cylindrical inner bore open at both said ends with each said end being provided with a flaring taper as a continuation of the surface of said bore, said tube having fully intercommunicated pores of a size not larger than 1 micron and a tensile strength sufficient to withstand radial outward pressures of up to about 100 Kg/cm$^2$, and a cylindrical reverse osmosis membrane bonded to the surface of said inner bore by means of an adhesive, said membrane being flared at its ends to conform to the end tapers of the porous tube and being evenly supported throughout the surface of said inner bore end tapers; said plurality of reverse osmosis assemblies being arranged as a tube bundle; a discharge header having a perforate plate arranged to receive one of the ends of said tube bundle and bonded thereto by means of said adhesive; a feeding header having a perforate plate arranged to receive the other ends of said tube bundle and bonded thereto by means of said adhesive; said feeding header, tube bundle and discharge header forming a high pressure leak-proof flow-path; an inlet provided in said feeding header; an outlet provided in said discharge header; pressure control valve means in said outlet; and liquid collecting means arranged to collect the liquid flowing through said reverse osmosis assemblies.

9. A reverse osmotic filtration apparatus as claimed in claim 8 wherein said reverse osmosis membranes comprise elongated hollow cylinders of cellulose acetate which are bonded to the surface of said inner bores of the said supporting tubes and tapers thereof by means of an epoxy resin adhesive.

* * * * *